United States Patent Office 2,781,346
Patented Feb. 12, 1957

2,781,346

O-(PHENYL CARBAMYL)-N-METHYL SCOPOLAMINE QUATERNARY AMMONIUM SALTS

Robert B. Moffett, Kalamazoo Township, Kalamazoo County, Mich., assignor to The Upjohn Company, Kalamazoo, Mich., a corporation of Michigan No Drawing. Application December 5, 1955,
Serial No. 550,836

3 Claims. (Cl. 260—292)

This invention relates to new organic compounds and is more particularly directed to new O-(phenylcarbamyl)-N-methyl-scopolamine quaternary ammonium salts.

The novel compounds according to the invention, can for the most part, be represented by the following general formula:

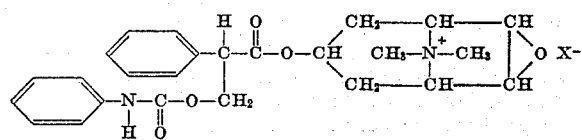

wherein X is a pharmacologically acceptable anion.

It is an object of the invention to provide novel and useful O-(phenylcarbamyl)-N-methyl-scopolamine quaternary ammonium salts. Another object of this invention is the provision of novel and useful O-(phenylcarbamyl)-N-methyl-scopolamine quaternary ammonium halides. Other objects of this invention will be apparent to those skilled in the art to which the invention pertains.

It has now been found in accordance with this invention that the novel O-(phenylcarbamyl)-N-methyl-scopolamine quaternary ammonium salts possess a combination of unexpected and highly useful therapeutic properties; specifically, a combination of high antisecretory activity with significant antispasmodic activity, relatively low toxicity and a lack of any appreciable action on the central nervous system. This is a highly advantageous superiority over the properties of scopolamine, esters of scopolamine and acid addition salts thereof, which adversely affect the central nervous system. The novel compounds of this invention are preferably prepared from scopolamine or its acid addition salts by the following reaction scheme:

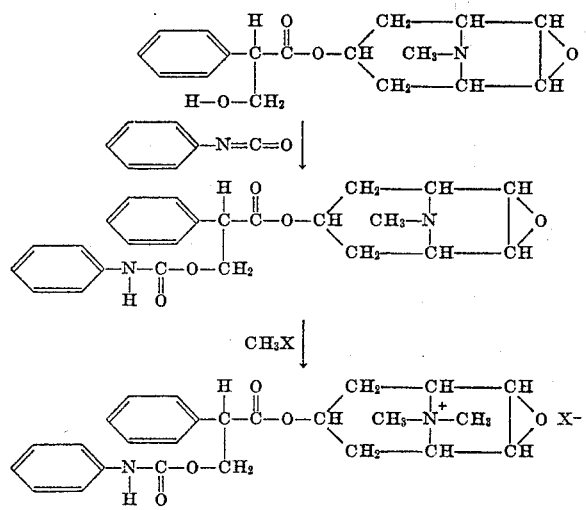

X is as defined above.

The starting materials for the invention include the various acid addition salts of scopolamine, such as the hydrobromide, hydrochloride, hydriodide, nitrate, sulfate, and the like, and the hydrates of these compounds. The acid addition salts are first converted to the free scopolamine base by treatment with an alkaline reagent, such as sodium carbonate and/or sodium hydroxide. In the alternative, the free scopolamine base may be used directly.

The free scopolamine base is reacted with phenyl isocyanate to form O-(phenylcarbamyl)-scopolamine, which can be isolated as such, or converted into an acid addition salt by reaction with an acid, such as hydrogen chloride in absolute ethanol. The generally crystalline acid addition salts serve as a means for purifying the free base and are readily reconverted to the free base by treatment with an alkaline reagent, such as sodium carbonate and/or sodium hydroxide. The free O-(phenylcarbamyl)-scopolamine base is then converted to an N-methyl quaternary ammonium salt thereof by reaction with a methyl derivative of a pharmacologically acceptable anion, such as methyl bromide, methyl chloride, methyl iodide, dimethyl sulfate, and the like. Since the pharmacological activity of the N-methyl quaternary ammonium salt is due to the cation, any anion which is pharmacologically acceptable (see U. S. Patent 2,708,651) can be used.

The invention may now be more fully understood by referring to the following example which is illustrative of the novel compounds of the invention and their preparation, but is not to be construed as limiting.

EXAMPLE.—PREPARATION OF O-(PHENYLCARBAMYL)-1-SCOPOLAMINE METHYL BROMIDE

*A. O-(phenylcarbamyl)-1-scopolamine hydrochloride*

To an aqueous solution of 43.8 grams (0.1 mole) of 1-scopolamine hydrobromide trihydrate was added 120 milliliters of ten percent sodium carbonate solution and the mixture was extracted twice with benzene. Then twenty milliliters of twenty percent sodium hydroxide solution was added to the aqueous solution and it was again twice extracted with benzene. The benzene solutions were combined and washed with water and then with saturated aqueous sodium chloride. The benzene solution was then dried azeotropically by distilling a portion of the solvent under reduced pressure. A clear solution was obtained.

To this clear colorless solution (volume about 200 milliliters) of 1-scopolamine base was added 24 grams (0.2 mole) of phenyl isocyanate. The solution became warm and was cooled to room temperature and allowed to stand for nineteen hours. Then 25 milliliters of absolute ethanol was added and, after standing for four hours, sixteen milliliters of 6.65 normal ethanolic hydrogen chloride was added. A little absolute ether was added to initiate crystallization. After filtering, 45.5 grams (99 percent) of white crystals of O-(phenylcarbamyl)-1-scopolamine hydrochloride, melting point 187–192 degrees centigrade with decomposition, was obtained. On recrystallization from about 400 milliliters of absolute ethanol, there was obtained 37.2 grams (81 percent) of white fluffy crystals; melting point 196–197.5 degrees centigrade with decomposition; $[\alpha]_D^{23}$ minus 22 degrees (1.012 percent in water). A sample was recrystallized again from absolute ethanol to give crystals having a melting point of 196.5–198 degrees centigrade with decomposition.

*Analysis.*—Calcd. for $C_{24}H_{27}ClN_2O_5$: C, 62.81; H, 5.93; N, 6.10; Cl, 7.73. Found: C, 63.00; H, 6.05; N, 6.16; Cl, 7.72.

*B. O-(phenylcarbamyl)-1-scopolamine methyl bromide*

To a cold aqueous solution of 27.5 grams (0.06 mole) of the above once recrystallized hydrochloride (melting point 196–197.5 degrees centigrade) was added 110 milliliters of ten percent sodium carbonate solution. The mixture was extracted twice with ether; then twenty milliliters of twenty percent sodium hydroxide solution was added to the aqueous solution and it was again extracted twice with ether. The ether solutions were combined, washed with water and then with saturated aqueous sodium chloride, and dried over anhydrous sodium sulfate.

The ether was removed by distillation and the residual gummy free base was dissolved in fifty milliliters of methyl ethyl ketone. The solution was cooled, 35 grams of cold methyl bromide was added, and the flask was stoppered and clamped. After standing at room temperature for two days, the crystalline product, O-(phenylcarbamyl)-1-scopolamine methyl bromide, was collected; weight 30.62 grams (98.7 percent based on the hydrochloride). This product was recrystallized from 400 milliliters of 95 percent ethanol giving 26.08 grams of white crystals; melting point 200.5–201.5 degrees centigrade with decomposition; $[\alpha]_D^{23}$ minus 18 degrees (0.531 percent in water).

*Analysis.*—Calcd. for $C_{25}H_{29}BrN_2O_6$: C, 58.03; H, 5.65; Br, 15.45. Found: C, 57.87; H, 5.70; Br, 15.39.

The O-(phenylcarbamyl)-1-scopolamine methyl bromide of this invention shows a gastric antisecretory activity ($ED_{50}$) of 0.06 milligram per kilogram intravenously in pyloric ligation rats. This value is the effective dose necessary to reduce gastric secretion by fifty percent. The antispasmodic activity, as determined by intravenous injection to Thiry-Vella dogs, is twenty percent of that of atropine sulfate.

Although the example describes the use of the 1-scopolamine and the preparation of an O-(phenylcarbamyl)-N-methyl-1-scopolamine quaternary ammonium salt, it is to be understood that the corresponding d- and d,l-scopolamines can likewise be employed as starting materials and when so employed the corresponding O-(phenylcarbamyl)-N- d- and d,l-scopolamine quaternary ammonium salts are obtained.

The novel compounds of this invention can be combined with solid or liquid pharmaceutical carriers and formulated into the form of tablets, powder packets, or capsules, or dissolved or suspended in suitable solvents, for oral or parenteral administration to human beings suffering from gastro-intestinal disorders. A suitable dosage unit is a tablet having the following composition:

| | | |
|---|---|---|
| O-(phenylcarbamyl)-1-scopolamine methyl bromide | milligrams | 5 |
| Lactose | grains | 1.3 |
| Sucrose | do | 0.04 |
| Starch | do | 0.075 |
| Calcium stearate | do | 0.02 |

A batch of 1000 of such five milligram tablets is prepared by the usual procedure comprising intimately mixing five grams of O-(phenylcarbamyl)-1-scopolamine methyl bromide with 84 grams of lactose and granulating with an aqueous solution of 2.6 grams of sucrose. After drying, the ganules are lubricated with 4.9 grams of starch and 1.3 grams of calcium stearate and compressed into tablets on a tablet machine. The other O-(phenylcarbamyl)-N-methlyl-scopolamine quaternary ammonium salts of this invention can be substituted for the O-(phenylcarbamyl)-1-scopolamine methyl bromide in this formulation.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound having the following general formula:

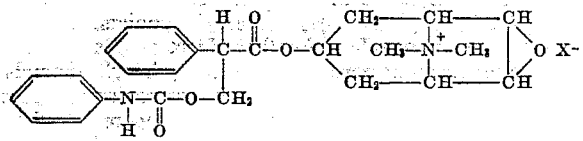

wherein X is a pharmacologically acceptable anion.

2. O-(phenylcarbamyl)-1-scopolamine methyl halide.

3. O-(phenylcarbamyl)-1-scopolamine methyl bromide.

No references cited.